United States Patent [19]

Reichard et al.

[11] 4,170,941

[45] Oct. 16, 1979

[54] IGNITER FOR A BLOCK OF PROPELLANT POWDER

[75] Inventors: Michel Reichard, Pessac; Georges Krassoulia, Le Bouscat, both of France

[73] Assignee: Societe Europeenne de Propulsion, Puteaux, France

[21] Appl. No.: 798,016

[22] Filed: May 18, 1977

[30] Foreign Application Priority Data

May 25, 1976 [FR] France .................................. 76 15836

[51] Int. Cl.² .................... F42C 19/08; C06D 5/00; F42B 13/28
[52] U.S. Cl. ................................. 102/202; 60/39.82 E; 60/256
[58] Field of Search ................ 102/49.7, 202; 60/256, 60/39.82 E

[56] References Cited

U.S. PATENT DOCUMENTS

| 2,959,001 | 11/1960 | Porter | 102/202 |
| 3,008,414 | 11/1961 | Jasse | 102/49.7 |
| 3,974,772 | 8/1976 | Pelham et al. | 102/202 |

*Primary Examiner*—Verlin R. Pendegrass
*Attorney, Agent, or Firm*—Fitzpatrick, Cella, Harper & Scinto

[57] ABSTRACT

An igniter for a combustible powder block comprises a non combustible receptacle with an ignition initiator arranged at one end of the receptacle and a charge in the receptacle for thrusting on to the combustible parts of the block to produce ignition, the charge including a pyrotechnic ejection compound, a pyrotechnic ignition compound and reactive divided metals, the charge having decreasing activity successively from the end of the receptacle carrying the initiative.

7 Claims, 4 Drawing Figures

IGNITER FOR A BLOCK OF PROPELLANT POWDER

BACKGROUND OF THE INVENTION

The present invention relates to an igniter for a block of combustible powder and in particular to a pyroballistic igniter of the type comprising an incombustible receptacle, an ignition initiator arranged at one end of the said receptacle and a solid charge placed inside the receptacle.

This type of igniter is designed for equipping rocket-propelled aircraft, rockets, and gas generators in particular or other devices using blocks of combustible powder.

In known igniters of the type stated above, the solid charge is made up of compositions generating gas and the combustion of the surface of the block of powder to be ignited is thus produced by the passage of a flow of gas comprising some incandescent particles. With these igniters it is often necessary to provide ignition reinforcement by adding ignition blocks to the surface which are of sensitive composition, such as explosive paints. This has the disadvantage of establishing normal overpressure or detonation running and imposes a very narrow range of functioning when it is advisable to guarantee sufficient reliability and safety.

SUMMARY OF THE INVENTION

It is an object of the present invention to avoid the disadvantages stated above and to make it possible to ignite the propellant powder thought to be difficult or to make it possible to re-ignite the propellant blocks after they have been spontaneously or deliberately extinguished.

According to the invention there is provided an igniter for a combustible powder block comprising a non-combustible receptacle, an ignition initiator arranged at one end of the said receptacle, and a solid charge placed inside said receptacle, for thrusting on to the combustible parts of said powder block to produce ignition and including a pyrotechnic ejection compound, a pyrotechnic ignition compound and reactive divided metals having decreasing activity in succession from the end of the receptacle carrying the initiator.

BRIEF DESCRIPTION OF THE DRAWINGS

The invention will now be described in greater detail, by way of example with reference to the drawings in which.

DESCRIPTION OF THE PREFERRED EMBODIMENTS

Figure 1:
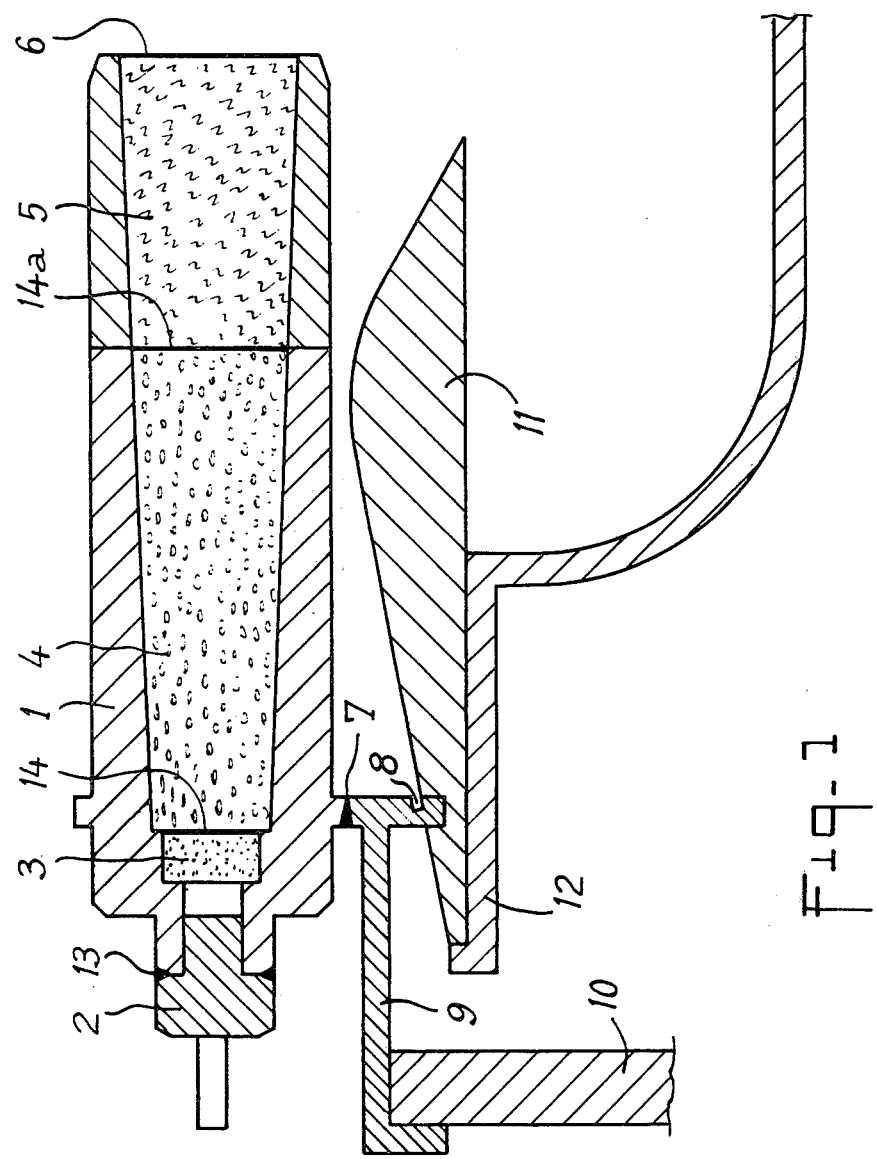
FIG. 1 is a schematic view in axial section of an embodiment of an igniter in accordance with the invention.

In a preferred embodiment of the invention it is proposed, in an igniter of the type mentioned at the outset, that the solid charge designed to be thrust against the combustible parts of the powder block in order to produce ignition comprises pyrotechnic compositions and reactive divided metals capable of interreacting exothermally in succession from the end of the receptacle supporting the initiator.

Thus such an igniter combustion of the surface of a powder block is not only produced by the passage of a flow of gas containing several incandescent particles but is largely due to thrust of grain or pellets in reaction and the projection of a fused metal mass which, spread out on the block and reacting therewith brings it to a temperature much higher than that necessary for its ignition. From the fact that this igniter uses energetic compositions emitting few volatile products it cannot appear to be of a detonating nature. Moreover, transfer of heat from the igniter to the block of powder is ensured by a mass of molten metal having a high heat capacity and the majority of the gases produced comes from combustion of the powder block itself thus governing the internal pressurization which has no reason to exceed the normal running pressure. This is favourable for relieving the structure of the propellant device.

According to an advantageous feature, the receptacle is flared and the initiator is arranged at the narrowest end of the receptacle.

In accordance with another feature, the solid load comprises a pyrotechnic ejection compound and reactive divided metals respectively having a decreasing activity in succession from the end of the receptacle supporting the initiator.

It is advantageous for the solid charge to comprise less than 10% by weight of ejection compound, 35 to 55% by weight ignition compound and 35 to 55% reactive divided metals.

The ignition composition and the reactive divided metals may be mixed if the chemical compatibility of the elements is effective in contact and if the intermetallic reactions are thus capable of being produced.

The igniter may be connected to the device containing the powder block to be ignited by a connection element capable of breaking when the normal running of the device containing the powder block is achieved.

In the case of classic assembly, the igniter is arranged in front of the propeller which contains a powder block hollowed out at the centre, and the imperviousness is obtained at the level of the nozzle by means of a calibrated membrane which may be tensioned.

In the case of assembly of the igniter on a propellant device nozzle at the centre thereof, the igniter is separated under the pressure of the gas coming from combustion of the propellant block by breaking the impervious connection connecting the igniter body to the device containing the propellant block, the break taking place in line with a calibrated break opening formed near the igniter body or on a flexible joint with or without grooving in the blast pipe of the cylindrical part of the igniter body.

Referring now to FIG. 1 of the drawings, an igniter comprising a receptacle 1 of non-combustible material, for example, metal and may also be seen comprising pyrotechnic compositions 3, 4, 5. An initiator 2 is set on the tubular body 1 at one of its ends and may be soldered to the body 1 for example by soldering by means of electron bombardment 13. The pyrotechnic compositions arranged in stages in the receptacle 1 from the end equipped with the initiator 2 are:

an atom ejection composition 3
an atom and lozenge ignition composition 4 reactive powder metals 5 as listed in order.

The different compositions 3, 4, 5 are separated by metallic membranes 14, 14a which have different resistances. A closing obturator 6 of the igniter is arranged at the end of the receptacle 1 which is opposite to the initiator 2 and ensures an impervious closure. The closure obturator 6 also constitutes a metallic membrane which is calibrated and may be tensioned. A connection element 7 integral with the body 1 has a shearing opening 8 calibrated in depth as well as a rigid or supple connection 9, for example made of elastomeric material having a release device 10. The connection element 7 is made integral with the orifice of a blast pipe 11 for escaping gases which is itself integral with the structure 12 of the body of the propellant device. The connection element 7 is also provided so as to ensure imperviousness.

The igniter is separated under the pressure of the gas coming from combustion of the propellant block 16 (FIGS. 2 and 3), when the propellant device has reached its appropriate normal operation after the solid charge 3, 4, 5 has been ejected, is produced by breaking the impervious connection 7 in line with the break opening 8 or by means of rupture at the level of the connection 9.

The receptacle of the igniter preferably has a flared shape, the initiator 2 being arranged on the side of the narrowest part of the receptacle.

After operation of the initiator the pyrotechnic ejection composition 3 causes projection of the loads 4 and 5 under predetermined ballistic conditions which depend on the relationships between the masses present for the different compositions 3, 4, 5 and the dimensions of the igniter (relationship between the internal diameters of the body 1 and the location of the membranes 14, 14a, 6). Nevertheless it should be noted that the membrane 14a cannot be a calibrated membrane and thus may only play the part of impervious separator between the products of a different nature without having a ballistic function.

The granular composition 3, may have the same chemical composition as the ignition composition 4, but must have a specific surface which is very larger in order to fulfill its role of ejection load.

Figure 2:
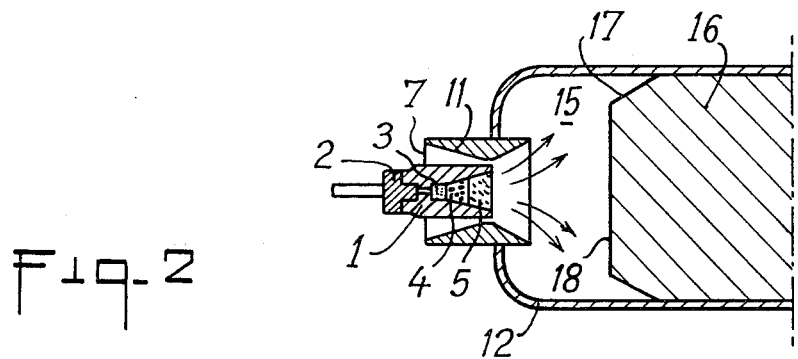
FIG. 2 is a schematic view in axial section of an igniter in accordance with the invention mounted on a different type of propellant device.
Figure 3:
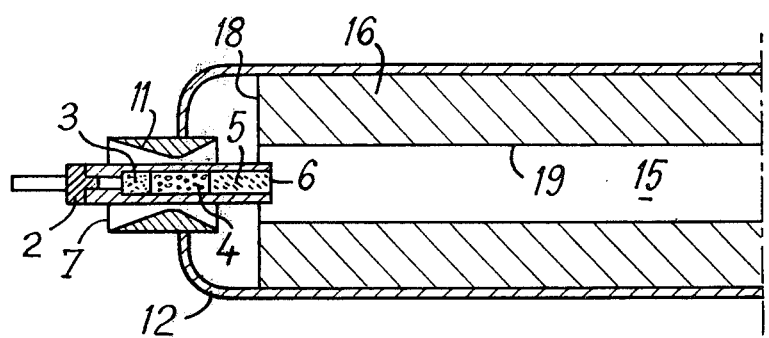
FIG. 3 is a view similar to FIG. 2 but showing the igniter mounted on another type of propellant device.

The ignition composition 4 made up of grains and pellets is ignited during the course of ejection by the composition 3 and is thrust into the dead volume 15 which is delimited by the powder block 16 to be ignited (FIGS. 2 and 3). At the same time, the composition 4 entrains the load 5 and heats it up beyond its fusion point. The load 5 reacts with the products of combustion of the composition 4 in the process of reaction and with the powder block 16 on which it has been spread out in the liquid state.

It is preferable for the ejection load 3 to make up less than 10% of the joint mass of the loads 4 and 5. These two loads 4 and 5 must have nearly identical masses, say 45% of the entire load. In any case, in accordance with the chemical characteristics and physical properties of each load, the latter proportions are capable of varying by ±10%.

The compositions 3 and 4 are mixtures accurately compressed from an oxidant such as nitrate, chlorate, perchlorate, chromates, oxides, alkalines or alkaline earths, with a reducer such as aluminium, boron, beryllium, tungsten, molybdenum, titanium, zirconium, thorium or some hybrids of these same elements.

The binding material is a reducing resin such as a polyester, an epoxide, a polybutadiene . . . , an oxidant such as fluoroethene, depending on the opportunity for equilibrium in the reactions envisaged and depending on the degree of conservation sought after.

The load 5 is constituted of metallic particles divided in the form of powder, grains or shavings . . . , the main features of which are the pyrophoric quality and the large calorific capacity. By way of example certain metals may be used as well as their alloys or mixtures: zirconium, magnesium, thorium, aluminium, titanium, beryllium, uranium, copper, cerium, niobium, tantalum, molybdenum, iron, palladium . . . etc., some of which also give intermetallic exothermal reactions which are taken into consideration within the framework of the invention.

Thus it is possible to accept a mixture of the charges 4 and 5 which may also produce intermetallic reactions, when the chemical compatibility of the elements in contact is effective.

FIGS. 2 and 3 show implementation of an igniter in accordance with the invention in order to ignite a block 16 of propellant powder integral with the front end, not shown, of a propellant device 12. This configuration of the powder block 16 in the propellant device 12 does not facilitate assembly of the igniter in front of the propellant device.

The igniter in accordance with the invention must thereof be placed at the neck of the blast pipe 11 and must ignite the rear face 18 and/or the axial cylindrical part 19 of the block 16, in a period of time which is compatible with the ballistic propulsion parameters.

In example of FIG. 2 the propellant block 16 has frontal combustion, is removed laterally at the level of the parts 17, in order to increase the combustion surface 17, 18 at the beginning of ignition of the block 16. The internal conical shape of the body 1 of the igniter favours staggering the thrust of the successive charges 4 and 5 over the right-hand face 18 and the lateral faces 17 of the block 16 and makes it possible to distribute the effects directed along the axis of the igniter.

In the example of FIG. 3 the propellant block 16 of the propellant device 12, on which the igniter is mounted, is particularly long compared to the diameter and is ignited in the central part 19. The receptacle 1 of the igniter, which may or may not be slightly flared, extends in the propellant device beyond the front part 18 of the propellant block 16.

Figure 4:
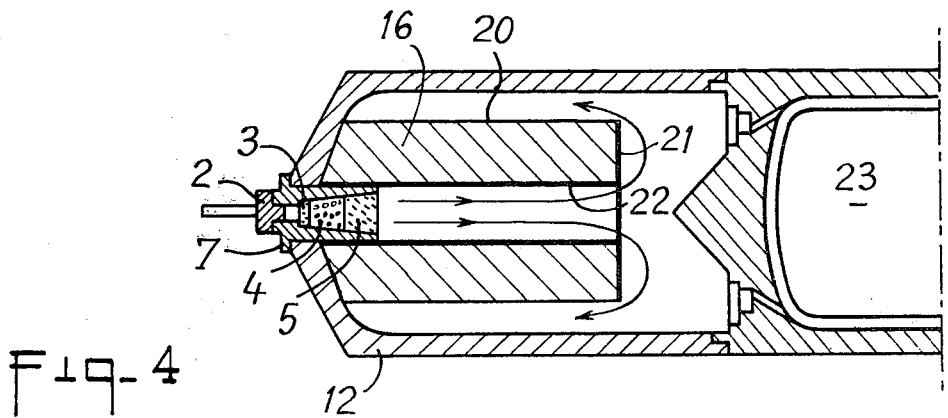
FIG. 4 is a schematic view in axial section of an igniter according to the invention mounted on a "gas generator" device.

FIG. 4 shows an igniter in accordance with the invention mounted on a "gas generator" device. Installation of an igniter in accordance with the present invention rather than a classic igniter avoids provision of boosters of supplementary powder at the surface of the block 16 generating gas. The powder block 16 is only ignited on its outer part 20, while the right-hand section 21 as well as the axial outflow 22 of the block are suppressed. The combustion pressure of the block 16 causes communication with the second chamber 23 in which a special bag has to be emptied.

Below a non-limitative example of the composition of a solid load 3, 4, 5 is given for an igniter in accordance with the invention designed to initiate a propellant powder block which is known for being difficult to ignite particularly at low pressure and low temperature.

The ejector load 3 comprises 5 g. of a boron-potassium perchlorate compound in the form of grains smaller than 400μ. The ignition compound 4 is made up of 10 g. of a mixture of boron-potassium nitrate agglomerated by polyester resin in the form of grains of 500 to 1200μ and by 10 g. of the same compound in the form of cylindrical pellets having the same height and diameter: 6 mm.

The charge at the front of the igniter is made up of 40 g. of pellets identical to the preceding ones, suitably arranged and also making up a part of the ignition compound 4, between which 60 g. of zirconium has been introduced in grains lower than 50μ, constituting the batch 5.

It will be understood that the above description of the present invention is susceptible to various modifications, changes and adaptions.

What is claimed is:

1. An igniter for a combustible powder block comprising a non-combustible receptacle, an ignition initiator arranged at one end of the said receptacle, and a solid charge placed inside said receptacle for thrusting on to the combustible parts of said powder block to produce ignition and including in succession from the end of the receptacle carrying the initiator a pyrotechnic ejection compound, a pyrotechnic ignition compound and reactive divided metals, wherein said reactive divided metals are capable of interreacting exothermally and of directly reacting with said combustible parts of said powder block, and wherein each successive element among said ejection compound, ignition compound and reactive divided metals has a slower burning rate.

2. An igniter as defined in claim 1, wherein said receptacle comprises a flared receptacle with said initiator arranged adjacent the narrowest end of said flared receptacle.

3. An igniter as defined in claim 1 wherein said solid charge comprises less than 10% by weight ejection compound, 35 to 55% by weight ignition compound and 35 to 55% by weight reactive divided metals.

4. An igniter as defined in claim 1 wherein said ignition compound and said ejection compound comprises grains and/or lozenges of mixtures of an oxidizer and a reducer agglomerated by a resin with the surface area of said ejection compound greater than the surface area of said ignition compound.

5. An igniter as defined in claim 1 and comprising at least one calibrated membrane interposed between said ejection compound said ignition compound for ensuring ballistic functioning of the igniter and physical isolation of the different parts of said solid charge and a further calibrated membrane forming an obturator and arranged at the end of the receptacle opposite the initiator for ensuring an impervious closure and ballistic functioning of the detonator.

6. An igniter as defined in claim 1, wherein at least one part of said ignition compound includes the reactive divided metals in admixture.

7. An igniter as defined in claim 1 and comprising an impervious connection including a breakage opening calibrated in depth close to the receptacle of the detonator for connecting said receptacle of said detonator to said propellant device in the centre of its nozzle and to enable separation of said receptacle from said propellant device by breakage of said impervious connection in line with said breakage opening under the pressure of gas coming from combustion of said propellant block when said propellant device has attained normal running.

* * * * *